Patented Feb. 4, 1941

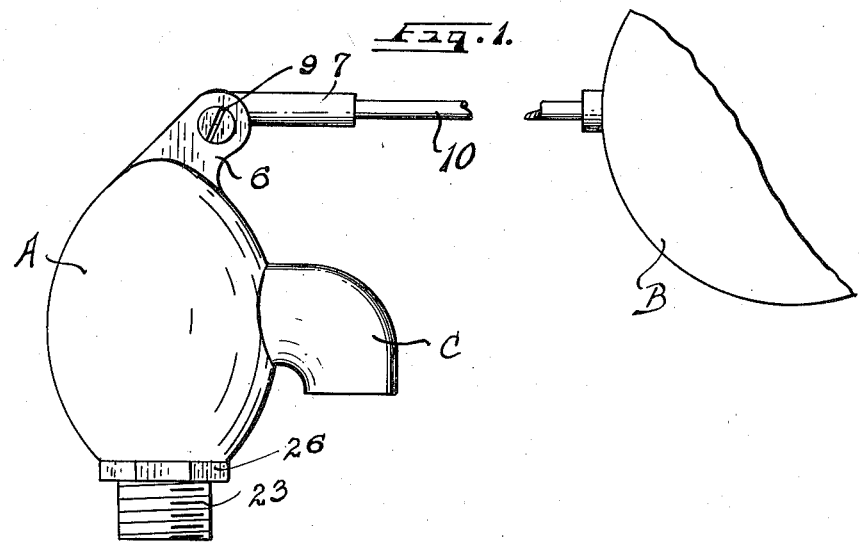
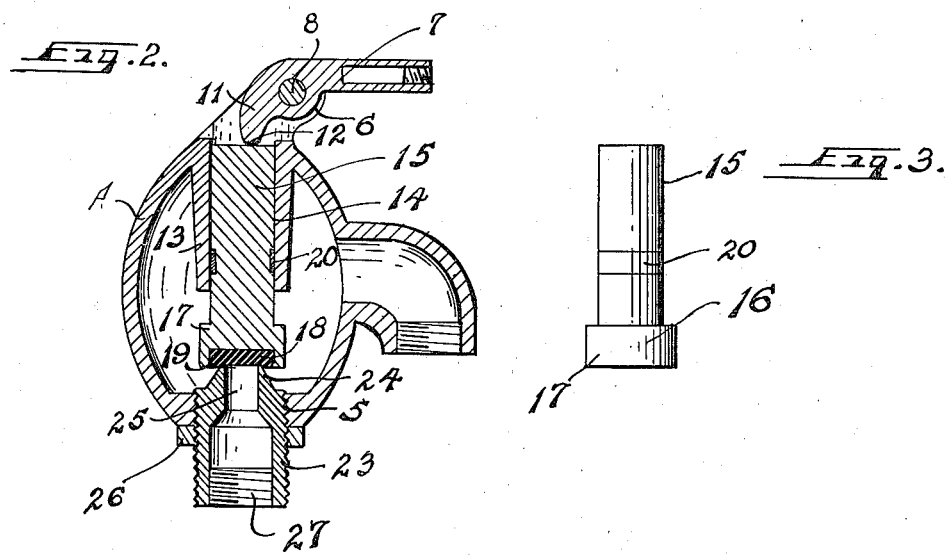

2,230,806

UNITED STATES PATENT OFFICE 2,230,806

BALL COCK VALVE

Edward H. Lohmolder, Salt Lake City, Utah

Application March 26, 1938, Serial No. 198,269

1 Claim. (Cl. 251—131)

My invention relates to water closets and has for its object to provide a new and efficient ball cock valve which will have a positive action and which will be silent in operation.

A further object is to provide a simplified construction of a ball cock valve which has but two moving parts within the valve and which further has no wearing parts to become worn and require replacement.

A still further object is to provide a water pressure opened valve so that when the water has been drawn from the tank the ball following the water level down, will raise the actuating lever releasing the tension of the plunger valve thereby leaving the valve free to be actuated by the water pressure; the pressure both opening and holding the valve open until the ball has been raised sufficient to close the valve.

These objects I accomplish with the device illustrated in the accompanying drawing in which similar numerals and letters of reference indicate like parts throughout the several views and as described in the specification forming a part of this application and pointed out in the appended claim.

In the drawing,

Figure 1 is a side elevation of the valve showing the ball float for actuating the valve control lever, parts cut away.

Figure 2 is a vertical diametrical section of the valve casing.

Figure 3 is a side elevation of the valve and its guide stem.

In the drawing I have shown my valve casing as an oblong or egg-shaped casing A, having the bottom open and internally threaded at 5 to receive the valve seat. The top is also open to allow for movement and actuation of the stem of the valve and each side of the top is provided with a boss or bearing 6 for receiving the pivot pin of the lever pivot.

Between these two bearing bosses 6, the control shaft 7 is pivotally mounted on a pivot shaft 8. This shaft is provided with a screw head 9 to permit easy removal thereof.

The outer end of the shaft 7 is internally threaded to receive the float ball rod 10 and the hollow float ball B is mounted onto the end of the rod. The inner end of the shaft 7 is turned down at 11 to form a valve stem engaging cam 12. The cam 12 and the shaft 7 form what might be termed a ball crank lever or a cam lever for actuating the valve, depending upon the position of the float ball B.

Extending down from the top of the casing A and concentrically therein, there is the valve stem guide 13 having the central bore 14 therethrough extended through the top of the casing A and in which bore the valve stem 15 of the valve 16 is carried and operated. The valve 16 consists of a round head 17 carrying a flat rubber washer 18 within a flange 19 on the lower side with the lower edge of the flange turned slightly inwardly to hold the valve washer in place. The stem 15 extends up from the valve head and has an annular packing ring or gland 20 formed therearound where it is passed through the guide 13, said packing being provided to prevent wear and to prevent the passage of pressure fluid. The valve seat cylinder 23 is screwed into the threaded bore 5 in the bottom of the casing A and is made with the top frusto-conical at 24 to form a valve seat and with a central bore 25 through which the water passes. This seat cylinder is held in place by a lock nut 26 and is internally threaded at 27 to receive the water supply pipe (not shown). From one side of the casing A there is a discharge elbow C which is internally threaded to receive the usual pipe for carrying the water to the bottom of the water tank to prevent excessive water splash and the resulting noise.

Having thus described my invention, I desire to secure by Letters Patent and claim:

A ball cock valve for water closets comprising, a hollow oval casing vertically disposed and having a bottom open end internally threaded; a depending frusto-conical hollow valve stem guide inside the casing extending down from the top thereof and forming with the wall of said casing an annular space surrounding the guide; an outlet elbow extending from one side of said casing with the end turned down; a valve seat screwed into the threaded bottom opening of said casing, said seat having the top end chamfered to form a small seating area; a valve carried in said casing having a stem in said guide extending to near the top of the casing, said stem having an annular groove therearound; a packing gland in said groove; an enlarged head on said valve having the lower surface forming a recess with a flange therearound with the inner edge of the flange turned inwardly to form a valve retaining burr; a soft rubber disk carried in said recess and held therein by said burr; upwardly and outwardly extended curved bosses formed one on each side of the bore through the valve guide; a control lever mounted with one end pivoted between said bosses and provided with a depending cam adapted to engage the top end of the valve stem to press it downwardly and seat the valve when the outer end of the lever has been raised.

EDWARD H. LOHMOLDER.